United States Patent

Mathes et al.

[11] Patent Number: 5,682,095
[45] Date of Patent: Oct. 28, 1997

[54] FERROMAGNETIC SPEED SENSOR

[75] Inventors: Joachim Mathes, Heilbronn; Jurgen Pirrung, Erligheim; Hans-Wilhelm Wehling, Oberhausen, all of Germany

[73] Assignee: ITT Automotive Europe GmbH, Germany

[21] Appl. No.: 256,023
[22] PCT Filed: Dec. 5, 1992
[86] PCT No.: PCT/EP92/02816
§ 371 Date: Jun. 21, 1994
§ 102(e) Date: Jun. 21, 1994
[87] PCT Pub. No.: WO93/12434
PCT Pub. Date: Jun. 24, 1993

[30] Foreign Application Priority Data
Dec. 19, 1991 [DE] Germany ............. 41 41 958.8

[51] Int. Cl.⁶ ............... G01D 5/14; F02P 7/06; G01B 7/30; G01P 3/487
[52] U.S. Cl. .............. 324/174; 324/207.2; 324/207.12; 324/235

[58] Field of Search .............. 324/207.2, 207.25, 324/174, 207.12, 225, 235, 251

[56] References Cited

U.S. PATENT DOCUMENTS

| | | | |
|---|---|---|---|
| 3,252,057 | 5/1966 | Hoeppel | 324/207.26 |
| 4,518,918 | 5/1985 | Avery | 324/207.2 |
| 5,045,920 | 9/1991 | Vig et al. | 324/207.2 |
| 5,325,005 | 6/1994 | Denk | 324/207.25 |

*Primary Examiner*—Walter E. Snow
*Attorney, Agent, or Firm*—J. Gordon Lewis; Thomas N. Twomey

[57] ABSTRACT

In order to ensure an optimal position of a magnet (3) in relation to a Hall IC (2) or, respectively, its Hall effect elements (4, 5), the magnet (3) and the Hall IC (2) are displaceable in relation to one another and, namely, in the direction of the lateral distance of the two Hall effect elements (4, 5). It is preferred that the Hall IC (2) is retained stationarily in the rotational speed sensor, and the magnet (3) is retained so as to be displaceable and lockable in position, in particular in a base member (10) of the sensor housing.

5 Claims, 2 Drawing Sheets

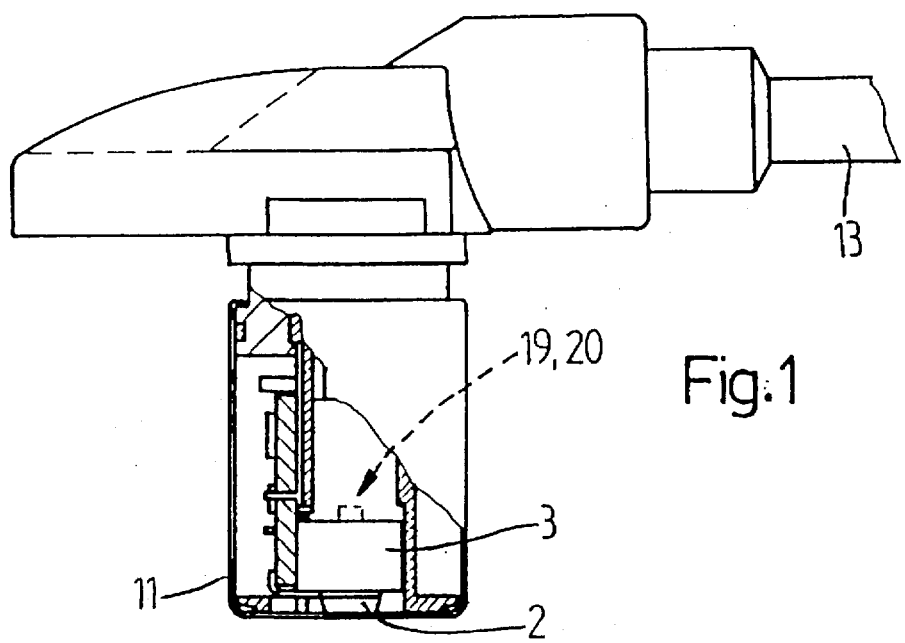
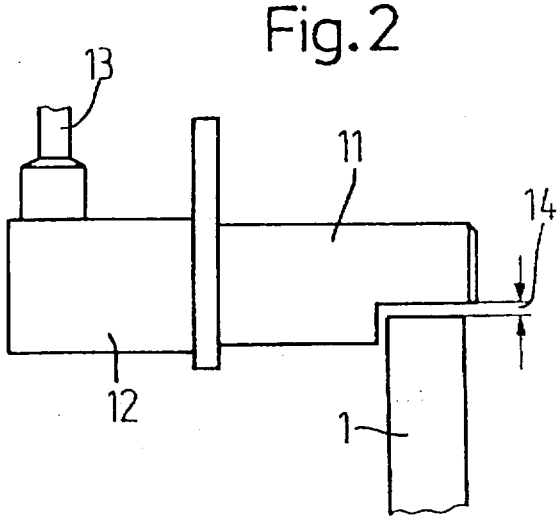
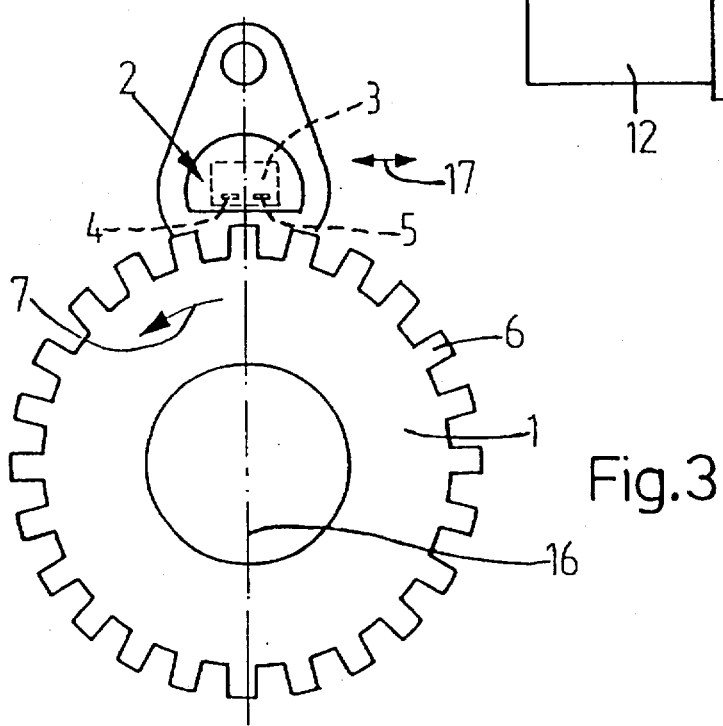

FERROMAGNETIC SPEED SENSOR

The present invention relates to a rotational speed sensor, in particular a gear wheel sensor, including a magnet and two Hall effect elements cooperating therewith and arranged in laterally spaced relationship one to the other, wherein a component part made of ferromagnetic material, in particular a gear wheel, which has an irregular periphery or a periphery with points of discontinuity, and the angle of rotation or rotational speed of which is to be determined, is movable past the Hall effect elements in the direction of the lateral distance.

The rotational speed of a component part or only its special position on standstill can be determined by means of such a rotational speed sensor and can be converted into a corresponding signal which can be processed further in a corresponding electronic device. Rotational speed sensors of this type are used whereever it is intended to sense rotational speeds or only angles of rotation. A special field of application are automotive vehicles and, more particularly, the automatic brake system (ABS) or the traction slip control (TSC) for driven wheels, or even engine management and gear management.

Such rotational speed sensors are high-precision apparatus, the elements of which need not only be manufactured very accurately, but also must be assigned one to the other. This applies in particular to the magnets and the two Hall effect elements.

In the case of a gear wheel sensor, the teeth of the gear wheel one after the other move past the Hall IC with the two Hall effect elements, the magnets and the electronic devices, such as a protective wiring, for example. Each tooth produces a pulse, and the rotational speed can be determined by computing the pulses. However, to be more precise, the matter is that the rotational speed sensor does not recognize the tooth as such, but recognizes each respective transition from tooth to tooth space, or vice versa. Thus, a complete signal results when a tooth and a tooth space each have moved past the rotational speed sensor or, in other words, when the gear wheel has been rotated further by one unit consisting of tooth and tooth space.

First of all, the sensor senses the so-called basic field of the magnet. Added to the field intensity of the basic field is still a field density which originates from the mass of the gear wheel or any similar component part. If, instead of a tooth space, a tooth is assigned to the sensor, this results in a repeated amplification of the magnetic field for the time the tooth is assigned to the sensor. Thus, when the gear wheel rotates, the field intensity varies in dependence on the teeth and tooth spaces moving past the sensor.

However, as the two Hall effect elements of the rotational speed sensor are offset in the circumferential direction of the gear wheel or the component part, respectively, when viewed in the direction of rotation of the gear wheel, the tooth first arrives at the first Hall effect element and, after a certain angle of rotation, at the second one. The resultant oscillations of the magnetic field of the two sensors are deferred in relation to each other.

If, however, a stationary tooth is simultaneously opposite to both Hall effect elements, the total magnet intensity at both Hall effect elements is of equal size. When forming the difference in a corresponding sum-and-difference amplifier, the value zero results. As stated before, when the gear wheel or any component part of the like rotates, the two oscillations are deferred in relation to each other, a sum-and-difference amplifier issuing a finite signal as a result. However, the values for the basic field and the mass of the component part neutralize each other so that the oscillation comprises only the increase in the magnetic field density which is due to the tooth.

The analog signal, which is furnished to the two Hall effect elements in a deferred manner, as stated above, and which a sum-and-difference amplifier emits, can be converted into a digital pulse train by means of a so-called Schmitt trigger. The pulse train can then be delivered to a corresponding electronics for processing.

It becomes apparent from the previous description that the difference signal corresponds to the theoretical value only if all conditions are correctly fulfilled. However, this is not true in practice because the magnets used happen to differ considerably from the ideal value in respect of their field intensity. With respect to the surface of e.g. the effective pole, the variation of the field intensity can differ such that, in spite of a correct geometrical assignment of the magnet to the two Hall effect elements, the Hall effect elements sense differing values of the magnetic field intensity of the basic field. However, as the magnets usually are permanent magnets and, consequently, their structure may be faulty, this problem cannot be eliminated in prior-art rotational speed sensors. Things are similar as regards the manufacturing tolerances of the analyzing circuit. It cannot be avoided that there are asymmetries between the Hall effect elements or in the difference signal. The result is an impaired operation of the rotational speed sensor up to a complete malfunction.

Consequently, the object is to develop a rotational speed sensor of the type previously referred to such that defects in the structure of the magnet or the analyzing circuit or the elements, respectively, can be sensed and compensated in order to thereby ensure the proper operation of the rotational speed sensor.

To achieve this object, it is proposed by the present invention that the rotational speed sensor according to the preamble of claim 1 is configured according to the characterizing portion of this claim.

In case the magnet or the analyzing circuit or the elements, respectively, exhibits a defective structure which has as a result, for example, an asymmetrical variation of the magnetic field intensity over the surface or only errors in the curve course, which leads to different output signals of the two Hall effect elements, while the rotational speed sensor, geometrically, is aligned correctly in relation to the component part or a tooth of the gear wheel, this can be corrected by displacing the magnet within the rotational speed sensor in the direction of the distance of the two Hall effect elements so long until both, with the tooth stationary, determine the same total intensity of the magnetic field. Now, a correct difference signal can be formed also by way of a sum-and-difference amplifier, which can then be analyzed or, in case of need, can be converted and analyzed. The total field intensity of the two Hall effect elements can be easily displayed, monitored and corrected by means of appropriate recording devices.

Thus, the optimal mounting position of the magnet in relation to the Hall IC can be determined accurately in a simple way.

According to an improvement upon the present invention, the Hall IC is rigidly mounted to the rotational speed sensor, while the magnet is supported so as to be slidable relative to the Hall IC. Compared to a displacement of the Hall IC, this is the more favourable solution because the magnet is not provided with electrical connections.

A particularly preferred embodiment of the present invention is characterized by the magnet being secured in a holding fixture and the holding fixture being slidably retained in a housing of the rotational speed sensor. This permits a conventional form of the magnet despite its slidable mounting support. It is preferred that the magnet has a circular cylindrical configuration.

Another variant of the present invention is characterized by a longitudinal guidance designed in the type of a groove-and-tongue joint, the tongue being, preferably, provided on the holding fixture of the magnet. The holding fixture can be made easily from sheet metal or the like, however, it must not impair the magnetic properties.

Further, it is very favourable that the magnet holding fixture is fixed after the adjustment of the rotational speed sensor, in particular by caulking. Especially in the last mentioned case, the optimal position found can be secured by minute means.

Hereinbelow, the present invention will be explained in more detail with reference to the accompanying drawings. The drawings show different embodiments of the invention. In the drawings, FIG. 1 is a side view of a first embodiment, the cross-section taken partly in longitudinal direction;

FIG. 2 is a side view of a second embodiment of the invention, the gear wheel being outlined;

FIG. 3 is a top view of FIG. 2 along with a gear wheel;

Figure 4:
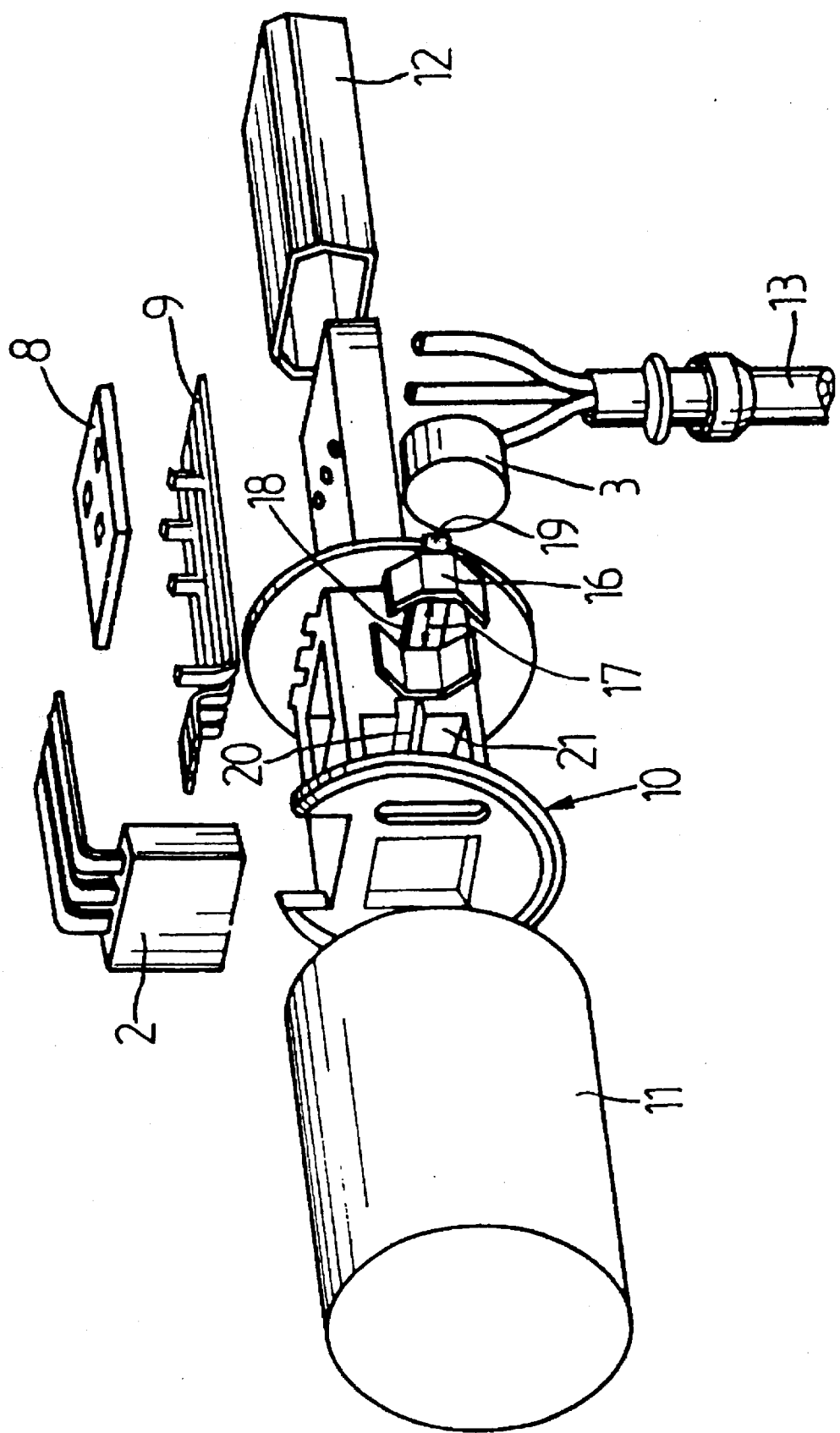
FIG. 4 is a perspective and explosion view of a third variant of the present invention.

It shall be assumed in the following that in all cases a gear wheel sensor is referred to which is to be used in conjunction with a gear wheel 1. The area which includes the Hall IC 2 and the magnet 3 is assigned to the teeth 6 of the gear wheel 1 in the manner to be seen in FIGS. 2 and 3. The Hall IC 2 is equipped with two Hall effect elements 4 and 5 which, according to FIG. 3, are offset laterally one to the other, when viewed roughly in circumferential direction of the gear wheel 1, so that each tooth 6 at first reaches the Hall element 5 and, subsequently, reaches the Hall element 4 when the gear wheel rotates in the direction of the arrow 7.

According to FIG. 4, each sensor is equipped with a plate 8 incorporating a series of electronic structural elements, in particular a protective wiring. In addition, there are inner electrical connecting elements 9, a base member 10, two covers 11, 12—in the embodiment of FIG. 4—as well as a connecting cable 13. Further elements (not described in more detail) can be of conventional type.

It can be seen in FIGS. 2 and 3 that there is a predefined gap distance 14 between the gear wheel 1 and the sensor in the area of the Hall IC 2 and the magnet 3, and that the two Hall effect elements 4 and 5 are assigned to a tooth, which is disposed on the Y-axis 16, for example, in such a way that they have the same lateral distance from this Y-axis, when viewed in the direction of rotation or sidewise.

If the magnet 3 is not free from defects, or the Hall effect elements 4 and 5 or, respectively, the analyzing circuit thereof, electrically, are not of a completely symmetrical design, which occurs frequently in practice, this means that in the configuration according to FIG. 3 the Hall effect elements 4 and 5 detect a different total magnetic field although, theoretically, it would have to be precisely the same. Above all, the reason for this is that the magnetic field extends asymmetrically, for example with respect to the Y-axis 16, or one of the elements exhibits a greater susceptibility. This may have as an effect that, for example, the field intensity from the magnet results in a greater value at Hall effect element 5 than at Hall effect element 4, or vice-versa.

In order to permit a basic adjustment which corrects such "errors" of the magnet, it is suggested according to the present invention that the magnet 3 according to FIG. 4 is inserted into a holding fixture 16 which is slidable in the sense of the double arrow 17 in the interior of the rotational speed sensor and, respectively, in relation to the base member 10, and which is lockably held in the final displacement position. The holding fixture of a circular cylindrical magnet 3, for example, can consist of two arcuate holding lugs which are interconnected through a bottom bridge 18 of the holding fixture 16. At the side of the bottom bridge 18 pointing away from the magnet 3, a tongue 19 is provided which, in conjunction with a groove 20 of the base member 10, forms a groove-and-tongue joint which permits proper displacement of the holding fixture 16 and, thus, also of the magnet 3 in the direction of the double arrow 17, that means in the direction of the lateral distance of the two Hall effect elements 4 and 5. For the sake of clarity, the double arrow 17 is sketched once more in FIG. 3. Also, the groove-and-tongue joint 19, 20 is outlined in FIG. 1. Consequently, the displacement is performed perpendicular to the drawing plane in FIG. 1. After the adjustment of the magnet in relation to the Hall IC 2 and, respectively, its two Hall effect elements 4 and 5, the holding fixture 16 in the base member 10 is locked in position by caulking. Moreover, it can be seen in FIG. 4 that the holding fixture 16 can be displaced, for example, in a tunnel-shaped seating 21 of the base member 10, whereby it is guided in an anti-lift manner.

The mode of operation of this rotational speed sensor is known and, therefore, need not be explained in more detail. Whenever a signal period consisting of tooth and tooth space is terminated, the Hall IC 2 each time issues a pulse to a control system, for example, for ABS, TSC or engine management of an automotive vehicle. The rotational speed of the gear wheel 1 and of elements rotatably connected therewith can be judged from the number of teeth and the number of pulses.

We claim:

1. A rotational speed sensor, in particular, a gear wheel sensor, comprising:

a magnet and two Hall effect elements cooperating therewith, each Hall effect element arranged along an axis in a laterally spaced relationship one to the other, said magnet producing a magnetic field;

means for displacing said magnet only in a direction that is parallel to said axis and relative to said Hall effect elements, wherein a displacement of said magnet compensates for incorrect function of said Hall effect elements caused by nonuniformities in said magnetic field, wherein said Hall effect elements are rigidly mounted in the rotational speed sensor, and said magnet is supported so as to be slidable relative to said Hall effect elements, wherein said magnet is secured in a holding fixture, and the holding fixture is supported and is slidable in a housing of the rotational speed sensor, wherein said holding fixture includes longitudinal guidance which is provided in the type of a groove-and-tongue joint, said tongue arranged on the holding fixture of the magnet.

2. A rotational speed sensor as claimed in claim 1, wherein said Hall effect elements are rigidly mounted in the rotational speed sensor, and said magnet is supported so as to be slidable relative to said Hall effect elements.

3. A rotational speed sensor as claimed in claim 2, wherein said magnet is secured in a holding fixture, and the holding fixture is supported so as to be slidable in a housing of the rotational speed sensor.

4. A rotational speed sensor as claimed in claim 3, wherein said holding fixture includes longitudinal guidance which is provided in the type of a groove-and-tongue joint, the tongue being preferably arranged on the holding fixture of the magnet.

5. A rotational speed sensor as claimed in claim 3, wherein said magnet holding fixture is adapted to being fixed relative to said Hall effect elements.

* * * * *